United States Patent
Hillman et al.

(10) Patent No.: US 7,404,427 B2
(45) Date of Patent: Jul. 29, 2008

(54) VEHICLE TIRE CHANGER WITH INTEGRATED DETECTOR FOR TIRE PRESSURE SENSORS

(75) Inventors: Scott Hillman, Granite City, IL (US); Timothy A. Strege, Sunset Hills, MO (US)

(73) Assignee: Hunter Engineering Company, Bridgeton, MO (US)

( * ) Notice: Subject to any disclaimer, the term of this patent is extended or adjusted under 35 U.S.C. 154(b) by 238 days.

(21) Appl. No.: 11/050,488

(22) Filed: Feb. 2, 2005

(65) Prior Publication Data

US 2006/0169414 A1    Aug. 3, 2006

(51) Int. Cl.
*B27H 7/00* (2006.01)
*B60C 25/00* (2006.01)
*B60C 23/00* (2006.01)
*B60C 23/02* (2006.01)
*H01H 35/24* (2006.01)

(52) U.S. Cl. .......................... 157/1; 340/447; 340/442; 200/61.25

(58) Field of Classification Search .................. 157/1; 340/447, 442, 445; 200/61.25; 116/34
See application file for complete search history.

(56) References Cited

U.S. PATENT DOCUMENTS

| 3,937,264 | A | * | 2/1976 | Mikovits et al. ............. 157/1.1 |
|---|---|---|---|---|
| 4,067,235 | A | * | 1/1978 | Markland et al. ........... 73/146.5 |
| 4,947,919 | A | * | 8/1990 | Timlin ......................... 157/1.24 |
| 5,602,524 | A | * | 2/1997 | Mock et al. .................. 340/447 |
| 5,731,754 | A | * | 3/1998 | Lee et al. ..................... 340/447 |
| 5,939,977 | A | * | 8/1999 | Monson ....................... 340/442 |
| 6,243,007 | B1 | * | 6/2001 | McLaughlin et al. ........ 340/447 |
| 6,304,610 | B1 | * | 10/2001 | Monson ....................... 375/259 |
| 6,474,380 | B1 | * | 11/2002 | Rensel et al. ............. 152/152.1 |
| 6,672,150 | B2 | * | 1/2004 | Delaporte et al. ........... 73/146.2 |
| 6,805,000 | B1 | * | 10/2004 | Sheikh-Bahaie ............ 73/146.8 |
| 6,822,582 | B2 | * | 11/2004 | Voeller et al. ................ 340/933 |
| 2003/0058118 | A1 | * | 3/2003 | Wilson ......................... 340/679 |
| 2004/0164140 | A1 | * | 8/2004 | Voeller et al. ................ 235/375 |
| 2005/0073435 | A1 | * | 4/2005 | Voeller et al. ................ 340/933 |

OTHER PUBLICATIONS

Pamphlet from web site/"The Tire Rack"—Tire Tech—Tire Pressure Monitoring Systems—General Tire Info—Jan. 24, 2005—3 pages.
Operation Instructions booklet—TC3250 Tire Changer—Hunter Engineering Company—1999-2002—Index through p. 49.

* cited by examiner

*Primary Examiner*—Joseph J. Hail, III
*Assistant Examiner*—Alvin J Grant
(74) *Attorney, Agent, or Firm*—Polster, Lieder, Woodruff & Lucchesi, L.C.

(57) ABSTRACT

An improved vehicle wheel tire changing system having a tire mount/dismount head coupled to an articulating tire mount/dismount arm assembly and a tire pressure sensor system which is configured to detect the presence of a tire pressure monitoring system sensor, mounted within a vehicle wheel assembly, prior to altering the mounting of a tire on an associated wheel rim.

27 Claims, 5 Drawing Sheets

VEHICLE TIRE CHANGER WITH INTEGRATED DETECTOR FOR TIRE PRESSURE SENSORS

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention is related generally to vehicle wheel tire changing systems, and in particular, to an improved vehicle wheel tire changing system configured to detect the presence of a tire pressure monitoring system sensor mounted within a vehicle wheel assembly prior to altering the mounting of a tire on an associated wheel rim.

Modern vehicle wheel assemblies on most motor vehicles today consist of a pneumatic tire mounted or seated on a wheel rim, such as shown in FIG. 1. The tire is secured to the wheel rim by forces exerted between the inner peripheral edges of the tire, i.e. the beads, and the mating surfaces of the wheel rim, i.e. the bead seats. Pressurized air contained within the toroidal volume defined between the tire and wheel rim supports the tire against the weight of the vehicle. Tire pressure monitoring systems associated with motor vehicles such as passenger cars and light trucks are designed to provide a warning to drivers if the pressure level of air within tire on the vehicle becomes significantly decreased during operation. There are two types of tire pressure monitoring systems currently in use. The first is an indirect system, which relies upon rotational speed measurements acquired by the vehicle anti-lock braking system sensors during vehicle operation. A tire which is significantly deflated relative to the remaining tires on the vehicle will have a smaller rolling radius, and therefore will rotate faster. Significant differences in vehicle wheel rotational speeds are interpreted as being indicative of an under-inflated tire by an indirect tire pressure monitoring system, and a suitable warning is provided to the vehicle operator. However, indirect tire pressure monitoring systems cannot identify small changes in tire pressures, and are incapable of identifying situations in which all of the vehicle wheels are under-inflated.

The second type of tire pressure monitoring system is a "direct" system, in which each wheel assembly of the vehicle is equipped with a tire pressure sensor disposed in an operative relationship to the pressurize air contained between the tire and wheel rim. For example, as is shown in FIG. 2, a tire pressure sensor may be strapped about the surface of the vehicle wheel rim, such that the tire pressure sensor is disposed within the volume defined by the tire about the wheel rim. Alternatively, as shown in FIG. 3, the tire pressure sensors may be coupled to, or associated with, the valve stem of the vehicle wheel assembly. Typically, tire pressure sensors are configured to transmit data using high-frequency radio waves in the preferred range of 300 MHz-450 MHz to a common control unit. Specific frequencies such as 303 MHz, 315 MHz, 418 MHz, 434 MHz, and optionally 868 MHz are generally employed by tire pressure monitoring systems currently in use. The common control unit is configured to process the received data and provide the operator with a suitable display of vehicle wheel tire pressures. An exemplary "direct" tire pressure monitoring system is manufactured and sold by Smartire Systems, Inc. of Richmond, Calif.

To prevent cross-talk between tire pressure monitoring systems of nearby vehicles, each tire pressure sensor is configured to transmit a unique identification code together with the tire pressure data signal. Depending upon the configuration of the particular "direct" system, and the signal range, the tire pressure monitoring system may be utilized to further monitor pressure in a vehicle's spare tire, or pressure in the tires of a towed trailer.

To provide a vehicle operator with useful information regarding tire pressure levels, a "direct" tire pressure monitoring system must provide the operator with a means to identify which monitored tires have reduced tire pressure. Identifying the vehicle wheel location for each tire pressure sensor in a vehicle tire pressure monitoring system may be done manually or automatically. Manual systems require some form of operator interaction, such as by physically installing predetermined tire pressure sensors in tires positioned in predetermined locations about a vehicle. Alternatively, each tire pressure sensor can be identified by a unique indicator to the common control unit, for example, a color-coded marking on the tire valve stem. When a low tire pressure condition is detected by one of the tire pressure sensors, the control unit displays a corresponding color to the vehicle operator, requiring the operator to inspect the vehicle wheels to locate the corresponding color marking. Manual systems often require the operator to retrain or reposition the tire pressure sensors following a vehicle wheel rotation or service, a time-consuming and error-prone procedure.

Alternatively, tire pressure monitoring systems may be configured to automatically identify the corresponding tire locations associated with each tire pressure sensor in the system. These "automatic" systems typically provide a trigger mechanism or signal to activate each tire pressure sensor's transmitter in a predetermined sequence. The unique identification associated with each transmitter is stored as it is received in the predetermined sequence, thereby associating each tire pressure sensor with a known tire location. For some systems, the tire pressure sensors include a magnetic switch which is activated or triggered by the proximity of a magnetic field to direct the tire pressure sensor to transmit the unique identification. Alternate systems incorporate a radio-frequency receiver into each of the tire pressure sensors. Each of the receivers responds to a specific trigger signal, typically around 125 MHz, to transmit the associated tire pressure sensor's unique identification. While the programming of an "automatic" system remains time consuming, the need to physically reposition each tire pressure sensor following a tire rotation or tire service is eliminated, saving significant time during a vehicle service procedure.

Still other tire pressure monitoring systems are fully automatic in terms of locating each of the tire pressure sensors associated with a vehicle. These systems typically employed radio-frequency antenna disposed in proximity to the vehicle wheels, and uniquely identify each individual tire pressure sensor by monitoring the strength of the signals emitted by each tire pressure sensor, specific antenna identification codes, or specific radio-frequency variations on the order of a few KHz, associated with each tire pressure sensor.

During a tire service procedure, it may be necessary to utilize a vehicle wheel tire changing system to remove a tire from a wheel rim, or to "break" the seated connection between the tire and wheel rim. A vehicle wheel tire changing system typically employs hydraulic or pneumatically actuated clamps and arms to secure and compress the tire during these procedures, thereby disassociating the tire beads or lips from the beadseat of the wheel rim. Significant forces are exerted on the tire and wheel rim during this process. If a tire pressure sensor associated with a tire pressure monitoring system is installed about the wheel rim, within the volume defined by the tire, it is possible for a vehicle wheel tire changing system to damage or destroy the tire pressure sensor if care is not taken during the tire service procedure.

Currently, an operator of a vehicle wheel tire changing system must either know in advance that a tire pressure sensor is present in a wheel assembly undergoing a tire service, or carry out a difficult visual inspection during the tire service to identify the presence of a tire pressure sensor. Accordingly, it would be advantageous to provide a vehicle wheel tire changing system with a means to detect the presence of a tire pressure sensor associated with a tire pressure monitoring system in a vehicle wheel assembly prior to removing or altering the mounting of the tire about the wheel rim. It would be further advantageous to provide a vehicle wheel tire changing system with a means to determine the operational condition of a detected tire pressure sensor prior to removal or altering of the mounting of the tire about the wheel rim.

BRIEF SUMMARY OF THE INVENTION

Briefly stated, one embodiment of the present invention is a vehicle wheel tire changing system designed to alter the mounting of a tire about a vehicle wheel rim, and which is configured with a sensor adapted to detect the presence of a tire pressure sensor mounted in a vehicle wheel assembly prior to altering the mounting of a tire on the wheel assembly.

In an alternate embodiment of the present invention, a vehicle wheel tire changing system designed to alter the mounting of a tire about a vehicle wheel rim, and which is configured with a transceiver adapted to detect the presence of, and communicate with, a tire pressure sensor mounted in a vehicle wheel assembly prior to altering the mounting of a tire on the wheel assembly.

In an alternate embodiment of the present invention, a vehicle wheel tire changing system designed to alter the mounting of a tire about a vehicle wheel rim, and which is configured with a transceiver adapted to detect the presence of, and communicate with, a tire pressure sensor mounted in a vehicle wheel assembly prior to altering the mounting of a tire on the wheel assembly. The vehicle wheel tire changing system is further configured with a pressure gauge adapted to measure tire air pressure, and is configured to compare tire pressure measurements obtained from the pressure gauge with measurements received from a detected tire pressure sensor to determine if the tire pressure sensor is operating within normal parameters prior to altering the mounting of the tire on the wheel assembly.

In an alternate embodiment of the present invention, a vehicle wheel tire changing system designed to alter the mounting of a tire about a vehicle wheel rim, and which is configured with a transceiver adapted to detect the presence of, and communicate with, a tire pressure sensor mounted in a vehicle wheel assembly prior to altering the mounting of a tire on the wheel assembly. The vehicle wheel tire changing system is further configured to respond to the detected presence of a tire pressure sensor mounted in a vehicle wheel assembly to modify at least one step in a process of altering the mounting of the tire about the vehicle wheel rim.

In an alternate embodiment of the present invention, a vehicle wheel tire changing system designed to alter the mounting of a tire about a vehicle wheel rim, and which is configured with a transceiver adapted to detect the presence of, and communicate with, a tire pressure sensor mounted in a vehicle wheel assembly prior to altering the mounting of a tire on the wheel assembly. The vehicle wheel tire changing system is further configured to identify an approximate location of the tire pressure sensor within the vehicle wheel assembly prior to altering the mounting of the tire on the wheel assembly.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
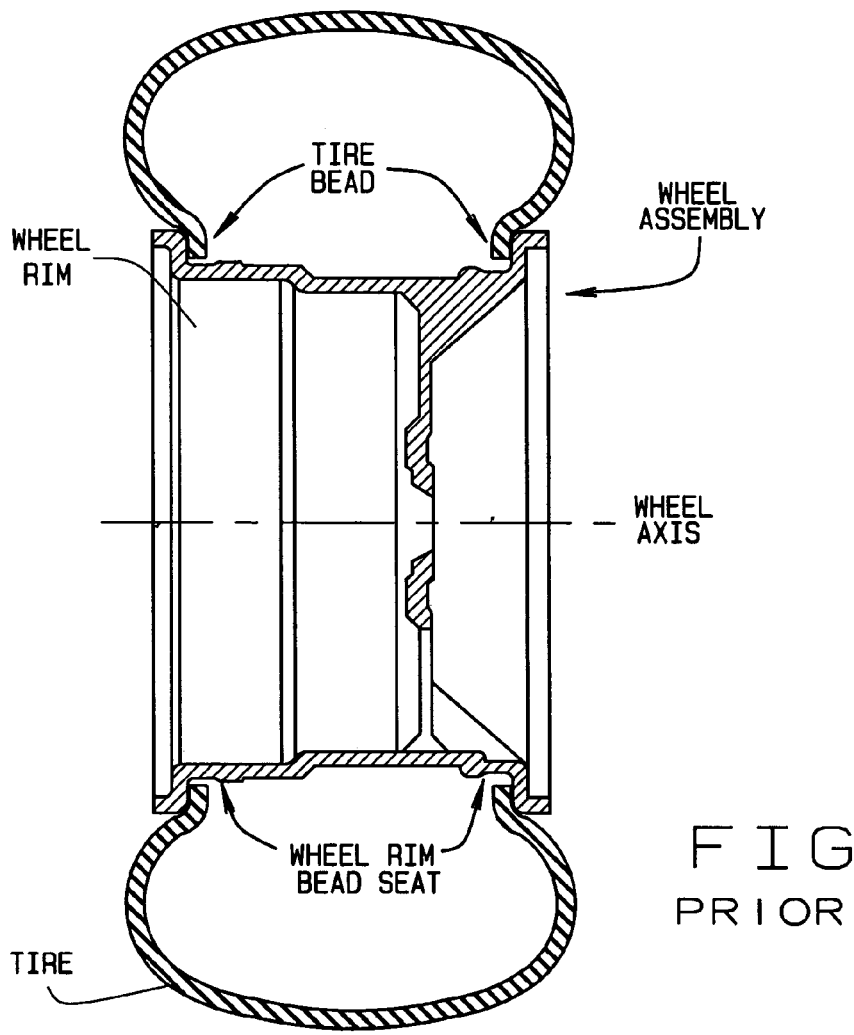
FIG. 1 is a prior art cross-sectional view of a vehicle wheel assembly, illustrating a tire seated about a wheel rim.
Figure 3:
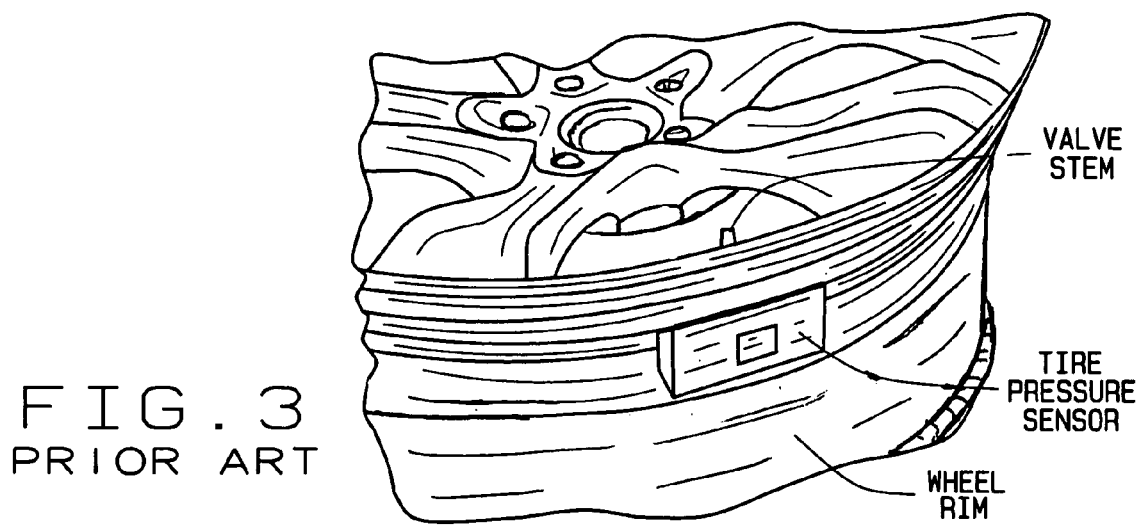
FIG. 3 is a perspective view of a vehicle wheel rim having a prior art tire pressure sensor operatively coupled to a wheel assembly valve stem.
Figure 2:
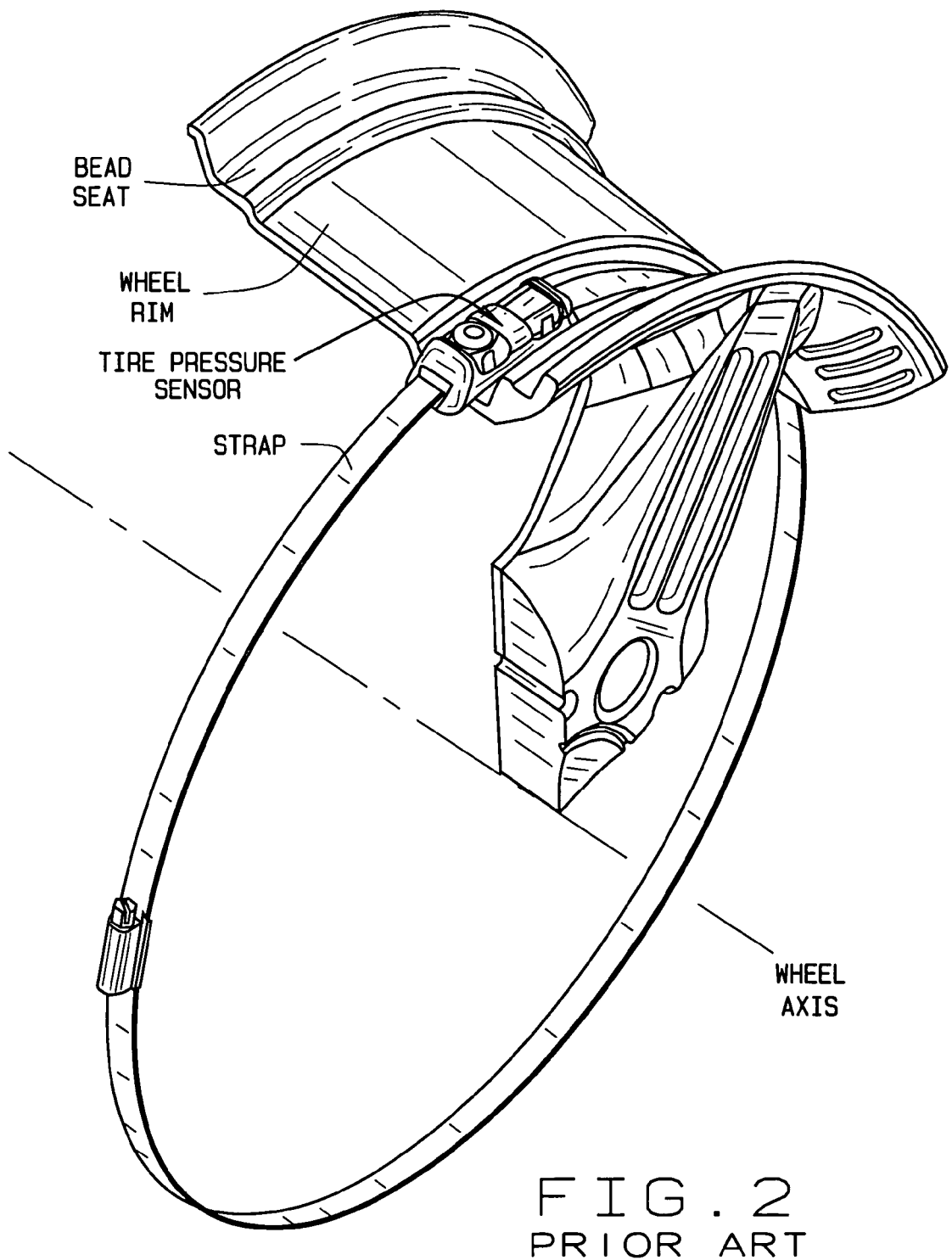
FIG. 2 is a perspective partial sectional view of a prior art tire pressure sensor of a tire pressure monitoring system secured about a vehicle wheel rim surface.
Figure 4:
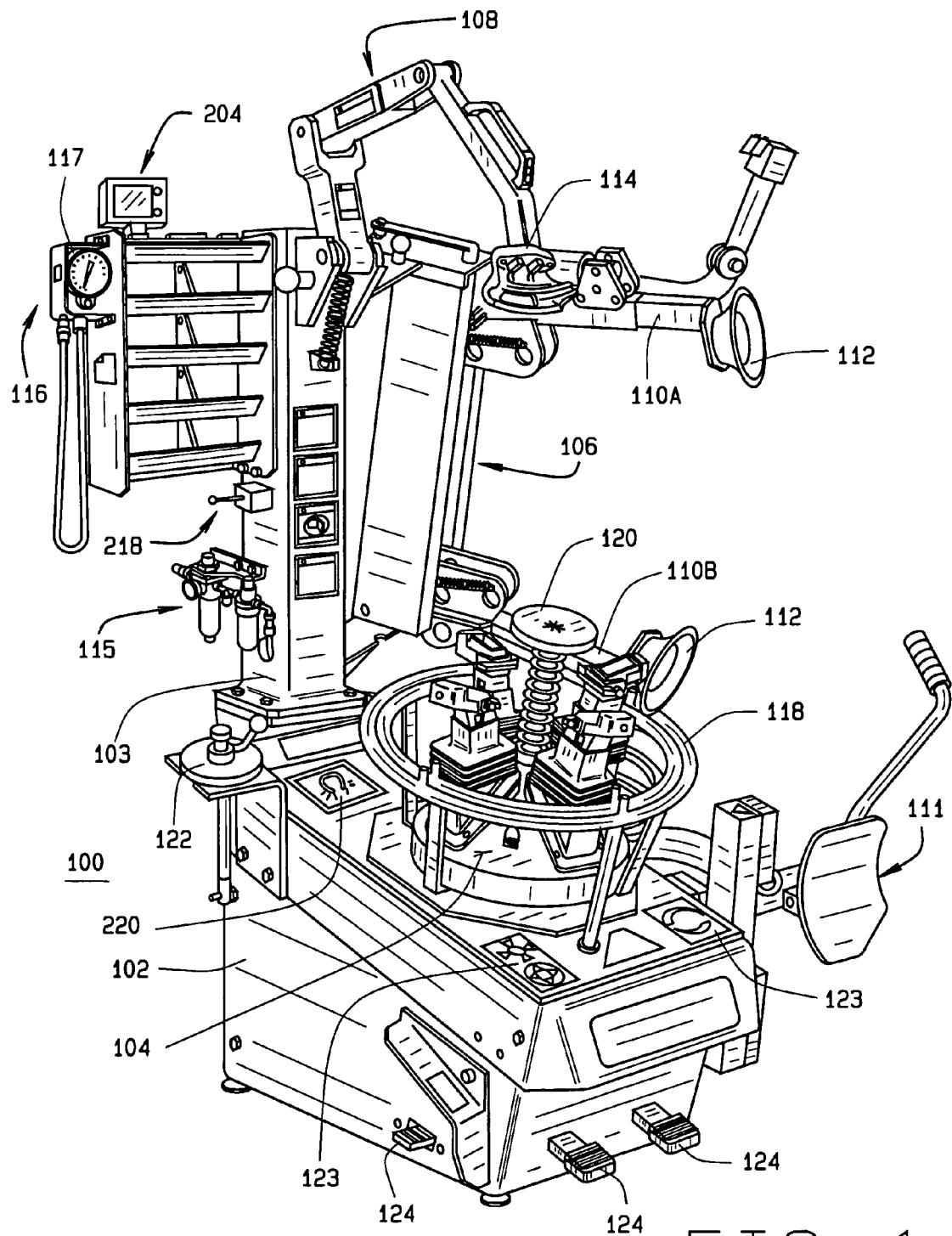
FIG. 4 is a perspective view of a vehicle wheel tire changing system embodiment of the present invention.

Turning to FIG. 4, a vehicle wheel tire changing system embodiment of the present invention is shown generally at 100. The vehicle wheel tire changing system 100 is shown configured with standard attachments for the mounting and dismounting of tires from wheel rims, however, it will be recognized that the vehicle wheel tire changing system 100 may be configured only to alter the mounting of a tire about a vehicle wheel rim, and not for removal or installation of a tire thereon. The vehicle wheel tire changing system 100 in one embodiment consists of a base 102 which supports a wheel assembly clamping system 104, and an accessory support structure 103. A bead roller assembly 106 and an articulating tire mount/dismount arm assembly 108 are secured to the accessory support structure 103 to operatively engage a wheel assembly secured by the wheel assembly clamping system 104. During a tire dismount or repositioning operation, the opposing arms 110A and 110B of the bead roller assembly exert a clamping force on opposite sides of a tire, such that bead rollers 112 displace the circumferential tire beads from the bead seats of an associated wheel rim. Optionally, an operator may manually utilize a bead breaker arm 111 to assist in displacing the tire bead from the bead seats of the associated wheel rim.

A tire mount/dismount head 114 is coupled to the articulating tire mount/dismount arm assembly 108, and may be utilized to assist in a tire service procedure by manipulating the tire sidewall portions as required to engage or disengage from the wheel rim bead seats. Additional components included with the vehicle wheel tire changing system 100 may include a regulator or coupling 115 for receiving compressed air from a remote source, a compressed air tire inflation assembly 116 with a pressure gauge 117, a tire air inflation ring 118, a wheel centering support 120, and removable wheel securing device 122. Operator controls, such as keypads, buttons, or switches 123 or a number of foot-activated control pedals 124 for controlling rotation of a wheel assembly and clamping of a wheel assembly may be provided.

Figure 5:
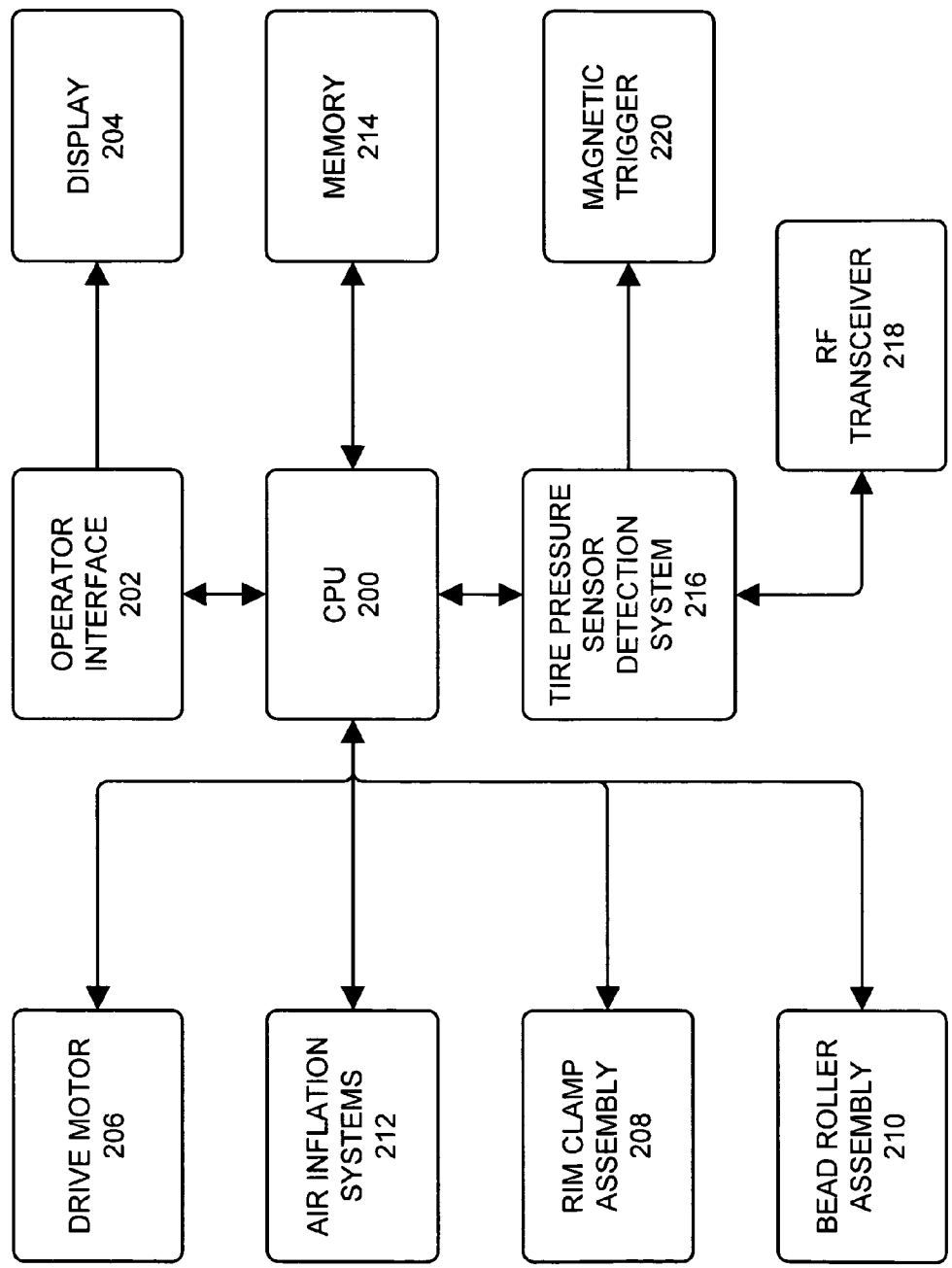
FIG. 5 is a block diagram of the components of an embodiment of the vehicle wheel tire changing system of FIG. 4.

As shown in FIG. 5, the various components of the vehicle wheel tire changing system 100 are controlled by a central processing unit 200, which may be a microprocessor, microcontroller, or any other logic circuit having suitable computational power to carry out the functions of the vehicle wheel tire changing system 100. The central processing unit 200 communicates with an operator to receive commands and provide information through an operator interface 202. The operator interface is associated with the various operator controls, such as keypads, buttons, or switches 123 or foot-activated control pedals 124, and may optionally include a display component 204 such as a LCD panel, one or more LEDs, or other component configured to provide an operator with visual information.

During operation of the vehicle wheel tire changing system 100, the central processing unit 200 optionally communicates with and/or controls the operation of a drive motor 206 for manipulating a wheel assembly, the rim clamp assembly 208, the bead roller assembly 210, and any associated compressed air inflation systems 212. An electronic memory 214 coupled to the central processing unit 200 stores operating instructions and data associated with the operation of the vehicle wheel tire changing system 100.

To enable the vehicle wheel tire changing system 100 to detect the presence of a tire pressure sensor in a vehicle wheel assembly prior to altering the mounting of a tire on the wheel assembly, the central processing unit 200 is associated with a tire pressure sensor detection system 216. The tire pressure sensor detection system 216 is configured to transmit a short range "trigger" signal in the immediate vicinity of the vehicle wheel tire changing system 100, such that a tire pressure sensor disposed within a wheel assembly secured by the wheel assembly clamping system 104 will respond by emitting a detectable signal. Preferably, the tire pressure sensor detection system 216 is configured with a radio-frequency transceiver 218 adapted to transmit a radio-frequency "trigger" signal at the appropriate radio-frequency for at least one brand of tire pressure sensor, as well as to receive responsive radio-frequency signals. Optionally, the tire pressure sensor detection system 216 may include an electro-magnetic trigger 220 adapted to generate a magnetic field trigger signal in proximity to the wheel assembly clamping system 104, as required by alternate brands of tire pressure sensors.

Those of ordinary skill in the art will recognize that the tire pressure sensor detection system 216 may be configured to transmit suitable "trigger" signals for a wide variety of tire pressure sensors available from different manufacturers, and as such, may be configured with a variety of components adapted to emit and detect the appropriate radio-frequency and/or magnetic signals to and from the tire pressure sensors. Such components are not limited to radio-frequency transceivers and electro-magnetic triggers as described herein, but may encompass any of a variety of trigger means and signal receivers as necessary to detect a selected brand of tire pressure sensor.

Similarly, those of ordinary skill in the art will recognize that the tire pressure sensor detection system 216 is not limited to embodiment as a hardware component separate and distinct from the central processing unit 200, but may be implemented as a software module operating within the central processing unit to control the associated signal transceiver components.

Figure 6:
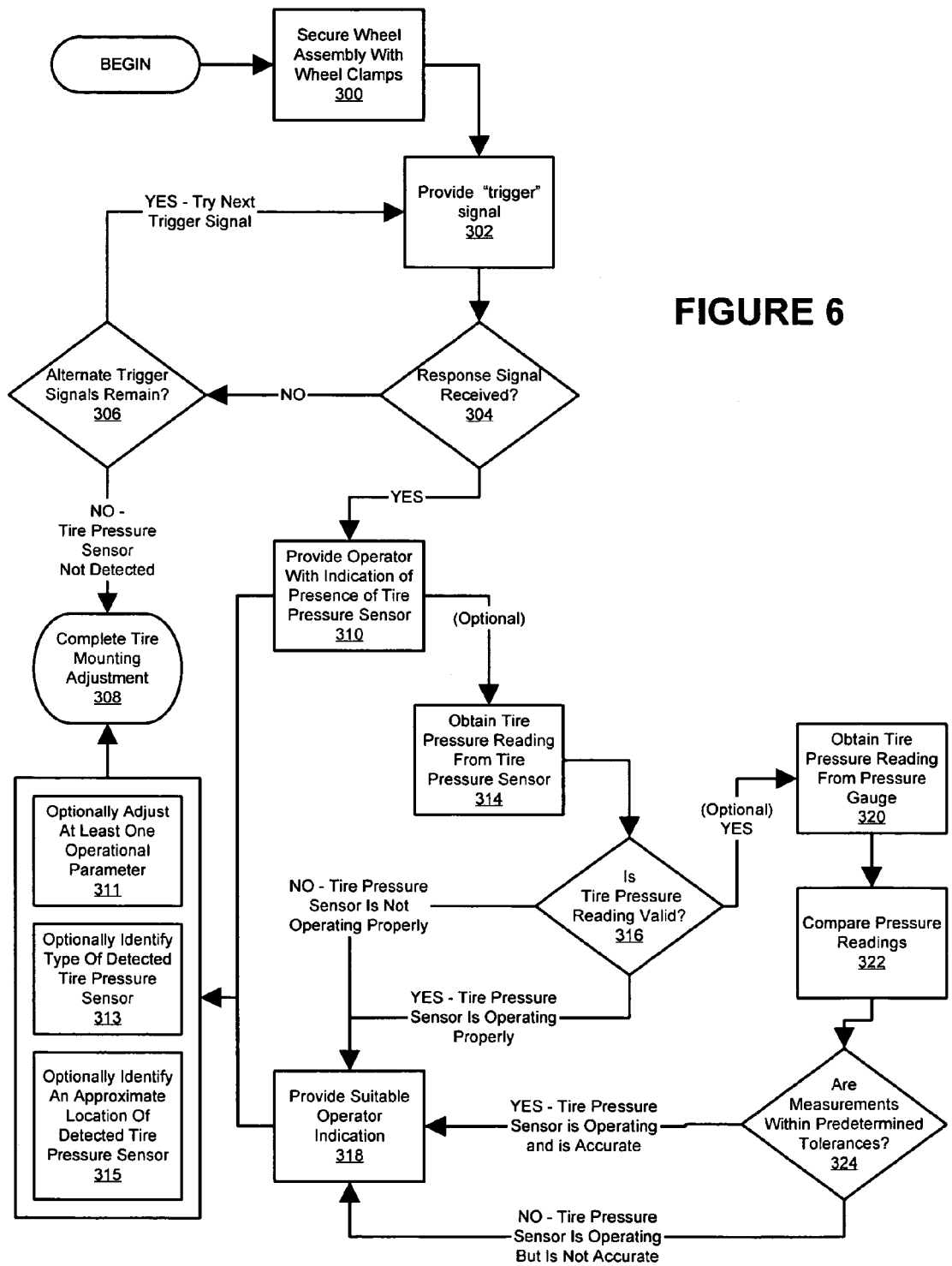
FIG. 6 is a flow chart illustrating the steps in the operation of an embodiment of the present invention.

Turning to FIG. 6, a method of operation of an embodiment of the present invention is shown. A vehicle wheel assembly including a wheel rim and associated tire is initially secured to a vehicle wheel tire changing system 100 by the wheel assembly clamping system 104 in a conventional manner (Box 300). Prior to altering the mounting of the tire on the wheel rim, the tire pressure sensor detection system 216 directs the transmission of at least one "trigger" signal (Box 302) and monitors for a corresponding response signal (Box 304) from a tire pressure sensor disposed in proximity to the vehicle wheel tire changing system 100. If no response signal is received, and the tire pressure sensor detection system 216 is configured with a sequence of alternate trigger signals (Box 306), the next trigger signal in the sequence is emitted (Box 302). Preferably, the tire pressure sensor detection system 216 is configured to cycle through a sequence of commonly utilized "trigger" signals corresponding to different brands of commonly utilized tire pressure sensors until a corresponding response signal is received or the sequence is completed.

If all available trigger signals have been emitted, and no response signals have been received, the vehicle wheel tire changing system determines that no tire pressure sensors have been detected, and the tire mounting alteration procedure is continued (Box 308).

In the event a response signal is received, the vehicle wheel tire changing system 100 provides the operator with a suitable indication (Box 310) of the detected presence of a tire pressure sensor in the wheel assembly, enabling the operator to take appropriate precautions when completing the tire mounting alteration procedure (Box 308).

Optionally, the vehicle wheel tire changing system 100 may be configured to alter at least one operational parameter (Box 311) in response to the detected presence of a tire pressure sensor in the wheel assembly, prior to completing the tire mounting adjustment (Box 308). The particular operational parameters which are altered may be dependant upon the particular type of tire pressure sensor which has been detected. By associating predetermined types of tire pressure sensors (i.e. valve stem tire pressure sensors or strap-on tire pressure sensors) with specific "trigger" signals, the vehicle wheel tire changing system 100 can optionally identify a likely type of tire pressure sensor detected (Box 313) in a vehicle wheel assembly based on which "trigger" signal elicited the response signal. For example, if the detected type of tire pressure sensor is likely a strap-on tire pressure sensor, the force exerted by the bead roller assembly 106 may be limited to a predetermined value or limit the amount of travel of the bead roller assembly to reduce the risk of the tire sidewall or bead being deflected far enough to damage the detected tire pressure sensor during the tire mounting adjustment (Box 308). Alternatively, if a valve stem type tire pressure sensor is detected, and the location of the valve stem on the vehicle wheel assembly is known, the vehicle wheel tire changing system 100 may control the force exerted by the bead roller assembly 106, in combination with the rotational position of the wheel assembly, to avoid deflecting the tire sidewall or bead in the vicinity of the valve stem.

Optionally, the vehicle wheel tire changing system 100 may be configured to identify the approximate position or location of the detected tire pressure sensor within the vehicle wheel assembly (Box 315) prior to completing the tire mounting adjustment (Box 308). The approximate position of the detected tire pressure sensor may be identified by the vehicle wheel tire changing system 100 using a variety of methods. As described above, identification of the specific type of tire pressure sensor detected within the vehicle wheel assembly may yield some information associated with the corresponding placement within the vehicle wheel assembly, particularly for valve-stem type tire pressure sensors. In an alternative embodiment, the antenna 218 may be a directional antenna, or an array of antennas, having sufficient directional resolution to identify the approximate location of the detected tire pressure sensor within the vehicle wheel assembly from the responsive signals emitted by the tire pressure sensor. Alternatively, a detected Doppler shift in the responsive signals emitted by the tire pressure sensor during rotation of the wheel assembly may by utilized to identify an approximate position of the tire pressure sensor within the vehicle wheel assembly.

Optionally, following the detection of a tire pressure sensor in a vehicle wheel assembly (Box 310), the operator can check the operational status of a detected tire pressure sensor before completing the tire mounting alteration procedure (Box 308) or any other optional steps (Box 311, Box 313, Box 315).

If the operator elects to check the operational status of a detected tire pressure sensor, the tire pressure sensor detection system 206 checks to see if a tire pressure measurement signals is being transmitted by the detected tire pressure sensor in the vehicle wheel assembly (Box 314). If the tire pressure measurement signal is detected, the tire pressure sensor detection system 216 checks to see if the signal represents a valid tire pressure measurement (Box 316). If no signal is received, or if the signal represents an tire pressure measurement which is outside of a predetermined acceptable range, such as a range defined by the inflation limits of the tire, a suitable warning is provided (Box 318) to the operator of the vehicle wheel tire changing systems 100 through the operator interface 202. The warning may be in the form of an audible warning, an illuminated LED, a displayed message, or any suitable combination thereof.

Optionally, if a valid tire pressure measurement is received by the tire pressure sensor detection system 216, the operator may choose to determine the accuracy of the measurement obtained from the tire pressure sensor. A measurement of the inflated pressure of the tire is obtained (Box 320) from the pressure gauge 116 associated with the vehicle wheel tire changing system 100, which is preferably calibrated to a desired degree of accuracy. The obtained measurement from the pressure gauge 116 is then compared with the received measurement from the tire pressure sensor (Box 322) to determine if the values are within a predetermined tolerance (Box 324). This comparison may be carried out automatically by the CPU 200, such as in vehicle wheel tire changing systems incorporating digital pressure gauges, or it may be carried out manually by an operator observing a pressure gauge display and a displayed pressure value received from the tire pressure sensor. If the pressure gauge measurement and the tire pressure sensor measurement are within a predetermined tolerance, a suitable indication is provided to the operator (Box 318) stating that the tire pressure sensor is operational and accurate to within the predetermined tolerance. If the measurements do not fall within the predetermined tolerance, a suitable indication is provided to the operator (Box 318) stating that the tire pressure sensor is operation, but is not accurate to within the predetermined tolerance.

Those of ordinary skill in the art will recognize that the various optional steps in the method of the present invention need not be carried out in the sequence described herein, but rather, all or some of the optional steps may be carried out in any suitable sequence required by the operator of configuration of the vehicle wheel tire changing systems 100.

Those of ordinary skill in the art will recognize that the present invention is not limited to use with a vehicle wheel tire changing system of the specific configuration shown and described herein, but may be utilized with any of a variety of vehicle wheel tire changing systems to provide a means for the detection of a tire pressure sensor in a vehicle wheel assembly prior to altering the mounting of a tire about a wheel rim. Similarly, a tire pressure sensor detection system 216 of the present invention, whether implemented as hardware or software, coupled to at least one means for providing a "trigger" signals to a tire pressure sensor, may be adapted for use in other vehicle service devices, such as a vehicle wheel balancer or vehicle wheel alignment system, where it may be useful for an operator to acquire information related to the inflation pressure of one or more vehicle wheels.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An improved vehicle wheel tire changing system having a means for securing a vehicle wheel assembly, a means for altering the mounting of a tire on a rim of the wheel assembly, the improvement comprising:
   a tire pressure sensor detection system configured to emit, prior to altering the mounting of the tire on the rim, at least one trigger signal and to receive an associated response signal from an unknown tire pressure sensor associated with the vehicle wheel assembly; and
   wherein said tire pressure sensor detection system is configured to respond to the receipt of said associated response signal.

2. The improved vehicle wheel tire changing system of claim 1 wherein said tire pressure sensor detection system includes a radio-frequency transceiver.

3. The improved vehicle wheel tire changing system of claim 2 wherein said radio-frequency transceiver is configured to receive at least one radio signal having a frequency between 300MHz and 450MHz.

4. The improved vehicle wheel tire changing system of claim 2 wherein said radio-frequency transceiver is configured to receive at least one radio signal having a frequency selected from a set of frequencies including 303MHz, 315MHz, 418MHz, 434MHz, and 868MHz.

5. The improved vehicle wheel tire changing system of claim 2 wherein said radio-frequency transceiver is configured to emit said at least one trigger signal at a frequency between 120MHz and 130MHz.

6. The improved vehicle wheel tire changing system of claim 5 wherein said radio-frequency transceiver is configured to emit said at least one trigger signal at a frequency of 125MHz.

7. The improved vehicle wheel tire changing system of claim 2 wherein said radio-frequency transceiver includes at least one directional antenna.

8. The improved vehicle wheel tire changing system of claim 1 wherein said tire pressure sensor detection system includes a electromagnet, said electromagnet configured to generate a magnetic field trigger signal.

9. The improved vehicle wheel tire changing system of claim 1 further including a central processor for controlling operation of the vehicle wheel tire changing system, wherein the central processing unit is configured to be responsive to a signal from said tire pressure sensor detection system to identify the operational status of a detected tire pressure sensor in a vehicle wheel assembly.

10. The improved vehicle wheel tire changing system of claim 1 further including a central processor for controlling operation of the vehicle wheel tire changing system, wherein the central processing unit is configured to be responsive to a signal from said tire pressure sensor detection system to identify the accuracy of a tire pressure measurement received from a detected tire pressure sensor in a vehicle wheel assembly.

11. The improved vehicle wheel tire changing system of claim 1 further including a central processor for controlling operation of the vehicle wheel tire changing system, wherein the central processing unit is configured to be responsive to a signal from said tire pressure sensor detection system to display a tire pressure measurement received from a detected tire pressure sensor in a vehicle wheel assembly.

12. An improved vehicle wheel tire changing system having a means for securing a vehicle wheel assembly and a means for altering the mounting of a tire on a rim of the wheel assembly, the improvement comprising:
    a means for emitting a trigger signal selected to initiate a transmission of a response signal from an unknown tire pressure sensor associated with a vehicle wheel assembly secured to the vehicle wheel tire changing system, said emitting means responsive to activation of the altering means to emit said trigger signal; and
    a means for detecting the presence of said tire pressure sensor by receiving said response signal.

13. The improved vehicle wheel tire changing system of claim 12 wherein said means for detecting includes at least one directional antenna configured to receive said response signal.

14. The improved vehicle wheel tire changing system of claim 12 wherein said means for detecting includes a plurality of antennas.

15. A method for operating a tire changing system to detect the presence of a tire pressure sensor disposed in a vehicle wheel assembly, comprising:
    securing the vehicle wheel assembly to the tire changing system;
    responsive to the securing of the vehicle wheel assembly to the tire changing system, emitting at least one trigger signal in proximity to said vehicle wheel assembly; and
    detecting a response signal emitted by a tire pressure sensor disposed in the vehicle wheel assembly in response to said at least one trigger signal.

16. The method of claim 15 for operating a tire changing system to detect the presence of a tire pressure sensor disposed in a vehicle wheel assembly further including the step of providing an indication of said detection.

17. The method of claim 15 further including the step of receiving, from said detected tire pressure sensor, a measurement of tire pressure;
    comparing said received measurement of tire pressure with a predetermined range of valid tire pressure measurements; and
    responsive to said comparison, providing an indication of an operational status of said detected tire pressure sensor.

18. The method of claim 15 further including the step of receiving, from said detected tire pressure sensor, a measurement of tire pressure;
    acquiring a second measurement of tire pressure from a calibrated external measurement device;
    comparing said received measurement of tire pressure with said second measurement of tire pressure; and
    responsive to said comparison, providing an indication of an accuracy of said detected tire pressure sensor.

19. The method of claim 15, responsive to the detection of a tire pressure sensor, further including the step of altering an operational parameter of said vehicle wheel service device.

20. The method of claim 15, responsive to the detection of a tire pressure sensor, further including the step of identifying a type of the detected tire pressure sensor.

21. The method of claim 15, responsive to the detection of a tire pressure sensor, further including the step of identifying a location of said detected tire pressure sensor within said vehicle wheel assembly.

22. An improved vehicle wheel tire changing system having a means for securing a vehicle wheel assembly, a means for altering the mounting of a tire on a rim of the wheel assembly, and a central processing unit configure with operating instructions for controlling the operation of the vehicle wheel tire changing system, the improvement comprising:
    a transmitter configured to emit at least one tire pressure sensor trigger signal;
    a receiver configured to receive at least one signal from a tire pressure sensor responsive to said trigger signal; and
    wherein said central processing unit is further configured with operating instructions to operate said transmitter and said receiver to automatically detect the presence of a tire pressure sensor in a vehicle wheel assembly in proximity to the vehicle wheel tire changing system prior to altering the mounting of the tire on the rim of the wheel assembly.

23. The improved vehicle wheel tire changing system of claim 22 wherein said central processing unit is further configured with operating instructions to alter the operation of at least one component of the vehicle wheel tire changing system responsive to the detection of a tire pressure sensor in a vehicle wheel assembly in proximity to the vehicle wheel tire changing system.

24. The improved vehicle wheel tire changing system of claim 22 wherein said central processing unit is further configured with operating instructions to identify a type of detected tire pressure sensor from a signal received by said receiver.

25. The improved vehicle wheel tire changing system of claim 22 wherein said central processing unit is further configured with operating instructions to identify a location of a detected tire pressure sensor within a vehicle wheel assembly from a signal received by said receiver.

26. The improved vehicle wheel tire changing system of claim 22 wherein said central processing unit is further configured with operating instructions to provide an operator with a display of a tire pressure measurement responsive to a tire pressure measurement signal received by said receiver from a detected tire pressure sensor.

27. The improved vehicle wheel tire changing system of claim 22 wherein said central processing unit is further configured with operating instructions to provide an operator with an indication of the presence of a tire pressure sensor within a vehicle wheel assembly responsive to a signal received by said receiver.

* * * * *